Apr. 3, 1923.

H. T. SMITH

VERNIER ADJUSTER

Filed Dec. 5, 1922

1,450,566

Inventor
H. T. Smith

By F. K. F. Bryant,
Attorney

Patented Apr. 3, 1923.

1,450,566

UNITED STATES PATENT OFFICE.

HARRY T. SMITH, OF KANSAS CITY, MISSOURI.

VERNIER ADJUSTER.

Application filed December 5, 1922. Serial No. 605,130.

*To all whom it may concern:*

Be it known that I, HARRY T. SMITH, a citizen of the United States of America, residing at Kansas City, in the county of Jackson and State of Missouri, have invented certain new and useful Improvements in Vernier Adjusters, of which the following is a specification.

This invention relates to certain new and useful improvements in vernier adjusters wherein extremely accurate adjustments are required for dial plates, more particularly in radio equipment, where it is desired to eliminate body capacity.

The primary object of the invention in its broad aspect, is to provide a device engageable with a dial plate in proximity of the peripheral edge thereof for procuring a vernier adjustment without the necessity of rotating the dial plate through the medium of the usual centrally positioned knob or button, the peripheral contact permitting an extremely fine adjustment or rotatable shifting of the dial plate.

A further object of the invention is to provide a portable device readily adaptable for use in connection with instrument boards in radio equipment of any type for engagement with rotatable dial plates to procure a vernier adjustment thereof, the device including a relatively long handle which eliminates body capacity that is occasioned by direct adjustment of dial plates in certain types of radio equipment.

With the above and other object in view as the nature of the invention is better understood, the same consists of the novel form, combination and arrangement of parts hereinafter more fully described, shown in the accompanying drawing and claimed.

Figure 1:
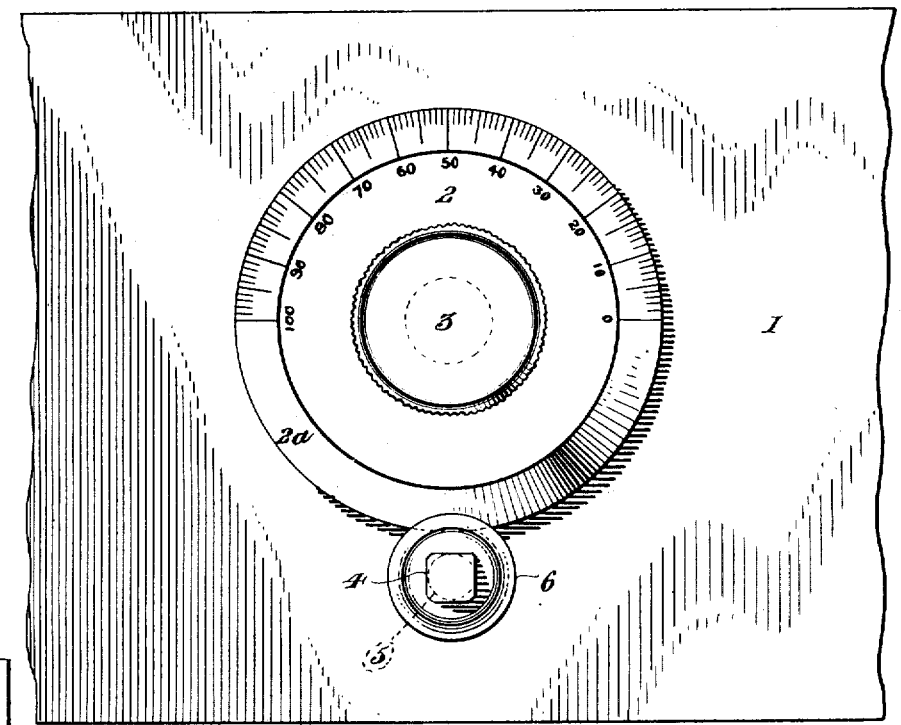
Figure 1:
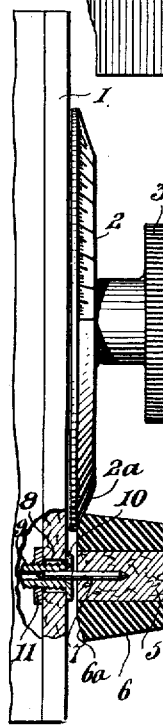
Figure 2:
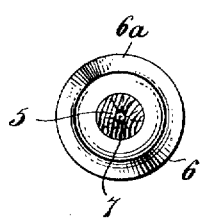
Figure 3:
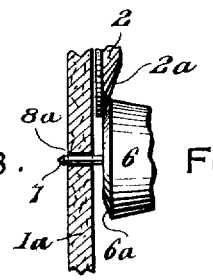
Figure 4:
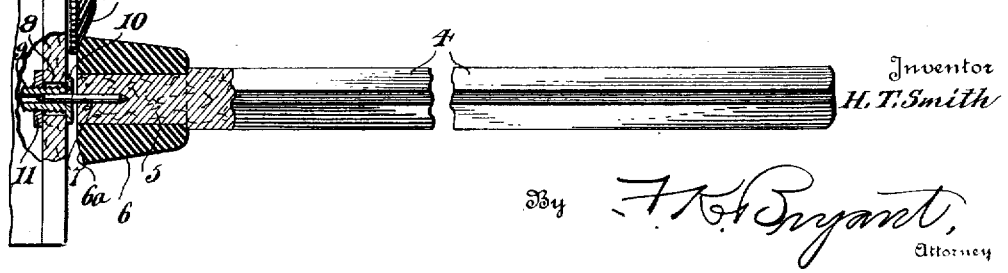

In the drawing, wherein like reference characters designate corresponding parts throughout the several views, Figure 1 is a fragmentary front elevational view of an instrument board for radio equipment showing a rotable dial plate journaled therein with the vernier adjuster operatively positioned on the instrument board for engagement with the dial plate and being readily detached from the instrument board, Figure 2 is a fragmentary end elevational view of the instrument board, partly in section with the vernier adjuster shown in side elevation, and partly in section detachably engaging the instrument board and contacting the dial plate in proximity of the peripheral edge thereof, and further illustrating the bearing for the vernier adjuster, Figure 3 is an end elevational view of the vernier adjuster showing the axial extension pin and the beveled edge of the head, and Figure 4 is a detail sectional view of another form of the invention showing the bearing pin for the vernier adjuster disposed in a bearing opening formed directly in the instrument board.

In the art of radio apparatus or equipment, and to which this invention particularly relates, rotatable dial plates or disks are mounted upon instrument boards for operating such devices as variable condensers, vario-couplers, rheostats, variometers, tuning dials, etc., and the present device is designed for procuring a relatively fine or vernier adjustment of the dial plate. Referring more in detail to the accompanying drawing, and particularly to Figs. 1 to 3, there is illustrated an instrument board 1 particularly designed for association with radio apparatus or equipment, and upon which board any number of rotatable dial plates or disks are mounted for operating the above noted devices, one of the disks being designated by the reference numeral 2 and having a central knob or button 3 for the usual operation thereof.

The vernier adjuster designed for engagement with the dial plate 2 in proximity of the peripheral edge thereof for procuring vernier adjustment embodies a relatively long handle 4 of a length sufficient to eliminate body capacity at the time of procuring the desired adjustment, the handle 4 being preferably polygonal in cross-section as shown in Figs. 1 and 2 to permit ready grasping thereof, although the same may be of any cross-sectional configuration desired. One end of the handle is reduced to provide a cylindrical extension 5 that is enclosed by head 6, preferably of frustoconical formation as shown in Figs. 2 and 3, the head being formed of insulating material such as rubber, fiber, bakelite, formica or any other similar material. A bearing pin 7 is axially positioned in the extension 5 of the handle 4 and projects beyond the end thereof as shown in Fig. 2.

The mounting or positioning socket for the vernier adjuster consists in providing an opening 8 in the instrument board 1 as shown in Fig. 2, an externally threaded apertured stud 9 being freely positioned in the opening 8 with the flange 10 upon one end thereof engaging the outer face of the instrument board, while a nut 11 is threaded upon the other end of the stud for engagement with the rear face of the board for clamping the stud in position thereon, the stud being positioned on the board adjacent the dial plate 2 as illustrated in Fig. 2.

In the operation of the device, the vernier adjuster has the projecting end of the pin 7 disposed within the opening or socket of the stud 9 which presents the lower beveled edge $6^a$ of the insulated head 6 in engagement with the beveled edge $2^a$ of the dial plate 2, rotation of the handle 4 causing rotation of the dial plate 2 by frictional contact therewith, as will at once be apparent from an inspection of Figs. 1 and 2. While the head 6 of the adjuster is illustrated as engaging the beveled edge $2^a$ of the dial plate 2, it is to be understood that the apertured stud 9 may be so positioned, and the head 6 of a design to present the latter for direct frictional contact with the peripheral edge of the dial plate. With a device of this character, body capacity is entirely eliminated in view of the length of the handle 4 while more accurate or venier adjustments are capable of being procured by rotating the dial plate 2 from a point in proximity of the peripheral edge thereof.

In the form of the invention shown in Fig. 4, the pin extension 7 carried by the head 6 is illustrated as being directly received in an opening $8^a$ formed in the instrument board $1^a$, and eliminating the necessity of providing the apertured stud 9. It is possible to provide apertured studs 9 or openings $8^a$ in the instrument board adjacent the several dial plates 2, and an entire group of dial plates may be adjusted or operated with a single vernier adjuster, the novelty of the present invention primarily residing in the provision of a portable hand implement designed for procuring vernier adjustment of dial plates employed in connection with radio apparatus for equipment.

While there are herein shown and described the preferred embodiments of the present invention, it is nevertheless to be understood that minor changes may be made therein without departing from the spirit and scope thereof as claimed.

What is claimed as new is:—

1. In apparatus of the class described, wherein a dial plate is rotatably supported on an instrument board, a vernier adjuster including a relatively long arm, an insulating head upon one end thereof, separable cooperating means carried by the adjuster and instrument board for positioning the head for frictional engagement with the dial plate adjacent the peripheral edge thereof, said cooperating means including a flanged externally threaded apertured stud secured in the instrument board adjacent the dial plate, means for retaining the studs in position, and an axial extension pin carried by the adjuster to be received in the stud.

2. In apparatus of the class described, wherein a dial plate is rotatably supported on an instrument board, a vernier adjuster including a relatively long arm, an insulating head upon one end thereof, separable cooperating means carried by the adjuster and instrument board for positioning the head for frictional engagement with the dial plate adjacent the peripheral edge thereof, said cooperating means including an apertured stud carried by the instrument board and an axial pin extension carried by the adjuster to be received therein.

In testimony whereof I affix my signature.

HARRY T. SMITH.